United States Patent
Pohl et al.

(10) Patent No.: US 7,399,362 B2
(45) Date of Patent: Jul. 15, 2008

(54) INSTALLATION FOR POWDER COATING OF ARTICLES

(75) Inventors: Werner Pohl, Neubulach (DE); Wolfgang Bezner, Schönaich (DE); Jürgen Hanf, Tübingen (DE); Peter Abel, Altensteig (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 422 days.

(21) Appl. No.: 10/908,013

(22) Filed: Apr. 25, 2005

(65) Prior Publication Data

US 2005/0247263 A1  Nov. 10, 2005

Related U.S. Application Data

(63) Continuation of application No. 10/296,931, filed as application No. PCT/EP02/02265 on Mar. 2, 2002, now Pat. No. 6,946,032.

(30) Foreign Application Priority Data

Mar. 28, 2001 (DE) ................ 101 14 376

(51) Int. Cl.
  *B05C 19/00* (2006.01)
  *B05B 7/14* (2006.01)
  *B05B 7/06* (2006.01)
(52) U.S. Cl. .............. 118/313; 118/308; 118/309; 118/326; 118/310; 118/320
(58) Field of Classification Search .............. 118/308, 118/309, 326, 310, 316, 320, 113–115; 427/424, 427/425, 426
See application file for complete search history.

(56) References Cited

U.S. PATENT DOCUMENTS

| 4,301,764 A | 11/1981 | Campion et al. |
| 4,590,884 A | 5/1986 | Kreeger et al. |
| 4,609,575 A | 9/1986 | Burkman |
| 4,823,731 A | 4/1989 | Howeth |
| 5,152,840 A | 10/1992 | Ruehl |
| 5,288,324 A | 2/1994 | Shaneyfelt |
| 5,690,995 A | 11/1997 | Fischli et al. |
| 6,357,386 B1 | 3/2002 | Keller |
| 6,946,032 B2 * | 9/2005 | Pohl et al. ............ 118/308 |
| 2002/0122892 A1 | 9/2002 | Dittalo |

FOREIGN PATENT DOCUMENTS

| DE | 73 18 275.9 U1 | 5/1975 |
| DE | 26 18 112 A1 | 11/1977 |
| DE | 90 137 24.8 U1 | 3/1992 |
| DE | 44 46 089 A1 | 6/1996 |
| DE | 195 00 872 A1 | 7/1996 |
| EP | 0 723 817 B1 | 4/2001 |
| JP | 59-80359 | 5/1984 |
| WO | WO 96/12568 | 5/1996 |

* cited by examiner

*Primary Examiner*—Yewebdar T Tadesse
(74) *Attorney, Agent, or Firm*—Factor & Lake, Ltd.

(57) ABSTRACT

An installation for powder coating articles, in particular vehicle bodies, comprises a coating booth, in which a plurality of application devices for the powder coating may be arranged. The articles to be coated are located during the coating process on a rotating rotary stand. Application devices located in various angular positions relative to the axis of the rotary stand may be charged with powder coatings of different colours. A collecting hopper is located at the bottom of the coating booth, the outlet opening of which collecting hopper may be brought as desired into connection with various recovery devices for powder overspray. To coat articles of different colours, the application devices charged with powder coating of the appropriate colour are activated in each case and the recovery device which collects the powder of the corresponding colour is brought into connection with the outlet opening of the collecting hopper.

23 Claims, 6 Drawing Sheets

US 7,399,362 B2

INSTALLATION FOR POWDER COATING OF ARTICLES

CROSS-REFERENCE TO RELATED APPLICATIONS

This application is a continuation of U.S. patent application Ser. No. 10/296,931, filed Nov. 26, 2002 (now U.S. Pat. No. 6,946,032), which is a national phase application based on International Patent Application Serial No. PCT/EP02/02265, filed Mar. 2, 2002, which claims priority to German Patent Application Serial No. 101 15 379.7, filed Mar. 28, 2001, all of which are incorporated herein by reference.

SPECIFICATION

The invention relates to an installation for powder coating of articles, in particular vehicle bodies, having
  a) coating booth, in which the articles may be arranged during the coating process;
  b) a plurality of application devices for the powder coating, which may be arranged inside the coating booth and which may act on the articles located therein;
  c) a recovery device for powder overspray, which in turn comprises:
    ca) a collecting hopper arranged at the bottom of the coating booth and comprising a lower outlet opening;
    cb) a collecting vessel for recovered powder coating;
    cc) a separating device;
    cd) an extractor fan, which sucks the powder coating collecting in the collecting hopper through the outlet opening of the collecting hopper into the separating device.

When coating articles, even using electrostatic powder coating, it is inevitable that some of the powder coating leaving the application devices will not stick to the articles but rather will be deposited as "overspray" on the side walls or collect in the bottom area of the coating booth. Since this overspray is of considerable material value, it is conventional to extract it, recover it by means of a separating device and then feed it back into the coating process. A filter device or a cyclone is particularly suitable as separating device.

The overspray located in the coating booth, in particular also on the walls of the coating booth itself, in the collecting hopper used for recovery and in the extraction lines of the recovery device constitutes a problem when a change has to be made from one colour of powder coating to another. Then, it is necessary to clean extremely thoroughly all the parts of the coating installation which have come into contact with powder coating during the previous coating process. Otherwise, there is a risk that powder coating from the previous coating process will mix with the other-coloured powder coating currently being processed, rendering the applied coating defective. Even slight contamination of the powder coating has a detrimental effect on the quality of the coating.

If large series of articles of the same colour are coated in a coating installation and the cleaning process is therefore necessary only at very long intervals, the cost and down time associated with this cleaning are of no particular consequence. This changes if a frequent change in the colour tone of the powder coating is desired, in particular in the case of relatively small series requiring coating. It has then to be ensured that the colour change may be performed quickly and at low cleaning cost.

A coating installation of the above-mentioned type is described in DE 195 00 872 A1. It is attempted therein to deal with the above-described problem by subdividing the bottom of the coating booth into two different areas: extraction from the radially more outward areas, which adjoin the side walls of the coating booth, is performed separately, such that in particular the powder coating which becomes detached from the side walls is removed separately and may then be thrown away. It is assumed with regard to this powder coating that it may be contaminated from previous coating processes. In the central area of the bottom, on the other hand, there is fitted a recovery device for powder coating which comprises a collecting hopper. The powder coating arriving in this collecting hopper is deemed uncontaminated and is supplied for reuse. During the coating process, the articles are conveyed in suspended manner through the coating booth by means of a conveying device and the same colour is applied thereto from all sides by a plurality of application devices.

With this design, the hope is that the side walls of the coating booth will not have to be thoroughly cleaned in the event of a colour change.

The coating installation described in DE 195 00 872 A1 exhibits several disadvantages: on the one hand, the distinction between clean powder coating, which is extracted in the central area of the bottom, and contaminated powder coating, which is removed from the area of the side walls of the coating booth, is not really well defined. To ensure that only completely clean powder coating is in fact reutilised, the radially outward annular area from which the powder coating is thrown away has to be kept comparatively large; a large amount of overspray has to be sacrificed to be on the safe side. On the other hand, this device does not prevent all the parts which belong to the recovery device itself from having to be cleaned thoroughly in the event of a colour change.

The object of the present invention is so to design a coating installation of the above-mentioned type that it may be used flexibly and in particular a colour change may be performed quickly.

This object is achieved according to the invention in that
  d) a rotary stand is arranged in the coating booth, to which the articles may be attached and which may be rotated about a substantially vertical axis;
  e) application devices arranged in various angular positions relative to the axis of the rotary stand may be charged with powder coating of various colours;
  f) a plurality of recovery devices is provided, which may be brought as desired into connection with the outlet opening of the collecting hopper.

The coating installation according to the invention may be understood in certain respects as a combination of a plurality of coating installations, which are each intended for operation with only one colour. This means that different application devices are present in the coating booth which may be charged with different colours. In order nonetheless to be able to apply powder coating to the articles from all sides, the invention provides a rotary stand in the coating booth, on which the articles to be coated are placed and by means of which they may be rotated past the application device processing the appropriate colour. Multiple instances of the recovery device for the overspray are also provided, separately for each colour. A colour change may thus be effected simply in that, on the one hand, different application devices are activated in the coating booth and, on the other hand, different corresponding recovery devices are connected with the outlet opening of the collecting hopper.

The number of recovery devices predetermines the maximum number of powder coating colours which may be processed in the coating installation according to the invention. The number of application devices should at least match the number of recovery devices, but may be larger. In the first instance, the articles are each coated with powder coating from only a single application device, in the second instance from several.

The greatest possible flexibility is achieved at the lowest possible capital expenditure for the coating installation according to the invention if each application device actually processes a different powder coating colour. Since then in general the articles have to be rotated on the rotary stand through the full 360.degree. for them to be coated from all sides, the coating process requires a relatively large amount of time. If, therefore, the coating installation is not required for processing the maximum possible number of different colours, a plurality of application devices may be charged with the same colour, such that a smaller angle of rotation suffices for complete coating of the articles. In this way, the duration of the coating process may be reduced and thus the throughput of the coating installation may be increased. In an extreme case, the coating installation according to the invention may also be operated conventionally, i.e. the application devices may all be charged with the same colour and rotation of the articles during the coating process may be dispensed with. The coating installation according to the invention may thus be used very flexibly.

It is expedient for a cleaning device to be provided with which powder coating may be detached from the walls of the coating booth and for a collecting device for waste powder to be provided, which may be brought into connection with the outlet opening of the collecting hopper while the cleaning device is active. This cleaning device is thus activated after conclusion of the coating process with a particular colour; it cleans the walls of the coating booth itself and optionally of the collecting hopper. The powder coating thus detached is collected by a separate collecting device and thrown away.

The cleaning device is appropriately a blowing device. It may comprise a tube displaceable in the axial direction and rotatable about its axis. This tube may for example be introduced into the coating booth progressively from above and directs a jet of air at all the walls of the coating booth as it is simultaneously rotated about its axis.

The blowing device is particularly efficient, and also reaches less readily accessible places, if a blowing arm swivellable about an axis perpendicular to the axis of the tube is attached to the end of the tube.

In a particularly preferred embodiment of the installation according to the invention, a flange surrounding the outlet opening is provided at the lower end of collecting hopper, wherein each powder recovery device comprises a suction discharge pipe, which may be moved to and fro between a first position, in which its suction opening is closed by the flange, and a second position, in which its suction opening communicates with the outlet opening of the collecting hopper. This construction does not require any separate valves for selective connection of the various powder recovery devices to the collecting hopper. It is sufficient to slip the respective suction discharge pipe under the outlet opening of the collecting hopper.

As already mentioned above, the coating installation described in DE 195 00 872 A comprises a suspension conveying system, with which the articles to be coated are conveyed continuously in one direction through the coating booth. A disadvantage of this is that the conveying system components may soil the coating booth. Therefore, in a preferred exemplary embodiment of the invention, provision is made for the conveying system to comprise a shuttle conveyor, which is in a position to receive from another part of the conveying system at least one article in a first position outside the coating booth and to bring the article into a second position inside the coating booth. This shuttle conveyor may be so designed that all the components thereof which may cause soiling remain permanently outside the coating booth proper. This may be achieved in particular in that the shuttle conveyor comprises a projecting extension arm, which projects into the coating booth in the second position.

It is also particularly preferred for the rotary stand to be arranged at the end area of the extension arm. The articles to be coated are then positioned on the rotary stand outside the coating booth and introduced in this way into the coating booth by means of the shuttle conveyor. Separate transfer of the articles to be coated onto the rotary stand inside the coating booth is then no longer necessary.

For smaller series, which do not require large coating installation throughput, the construction of the invention is appropriately used in which the shuttle conveyor is in a position to bring the article, of which there is at least one, back from its second position inside the coating booth into its first position on the other part of the conveying system. The articles thus move back out of the coating booth at the same point at which they are introduced thereinto. This has the advantage that a comparatively large number of application devices may be arranged around the coating booth, since a door preventing attachment of application devices is present on only one side.

If, on the other hand, a high throughput is desired for the coating installation, the construction of the invention may be used in which a second shuttle conveyor is provided, which is in a position to receive the article, of which there is at least one, in the second position thereof inside the coating booth and to transfer it to a further part of the conveying system in a third position outside the coating booth. In this case, therefore, the articles exit from the coating booth at a different point from where they enter. This has the advantage that the coating installation may be operated on a continuous pass-through basis. However, not so many application devices may be accommodated in the coating booth.

Exemplary embodiments of the invention are explained in more detail below with reference to the drawings, in which.

Figure 1:
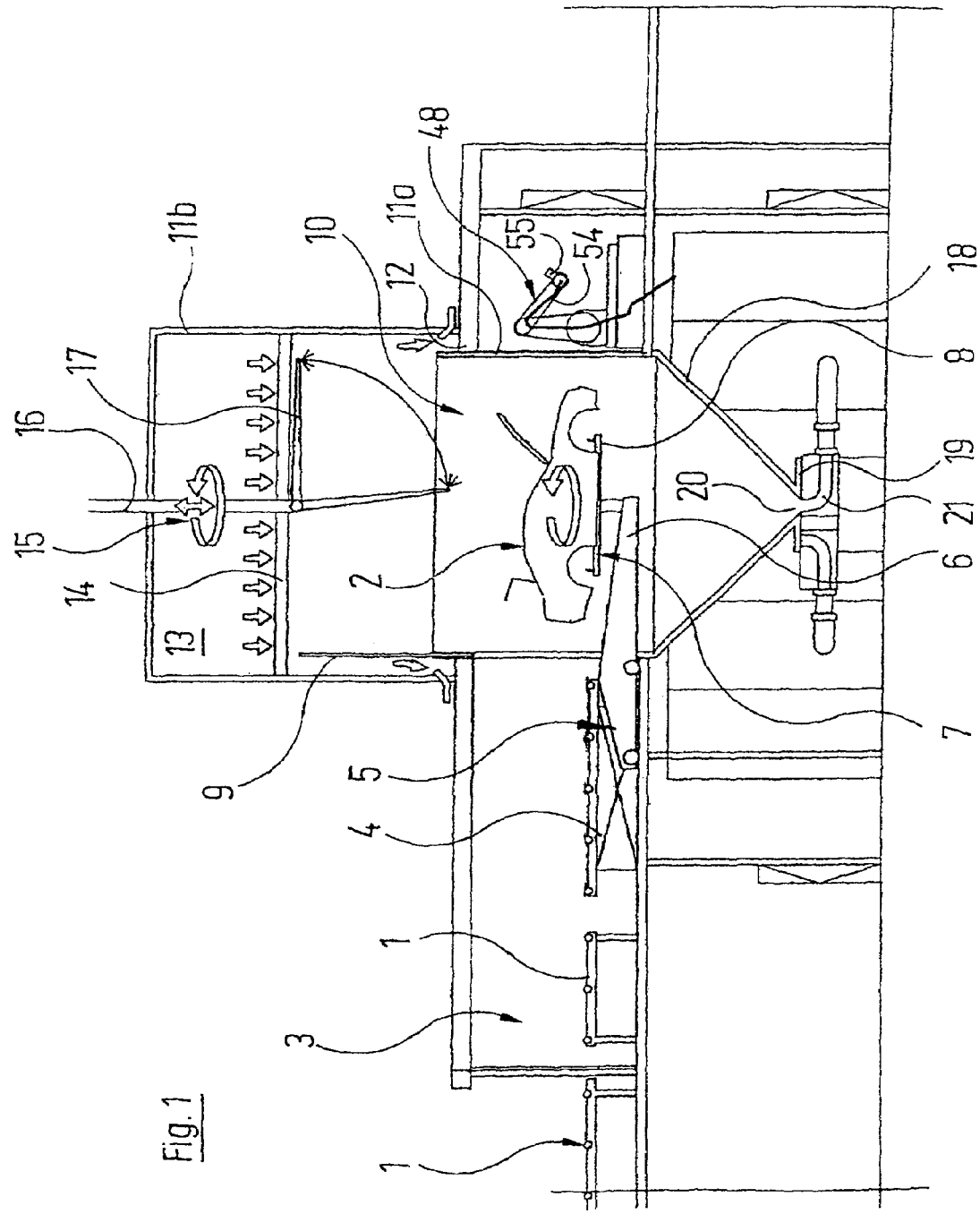
FIG. 1 is a vertical section through a first exemplary embodiment of a coating installation.
Figure 2:
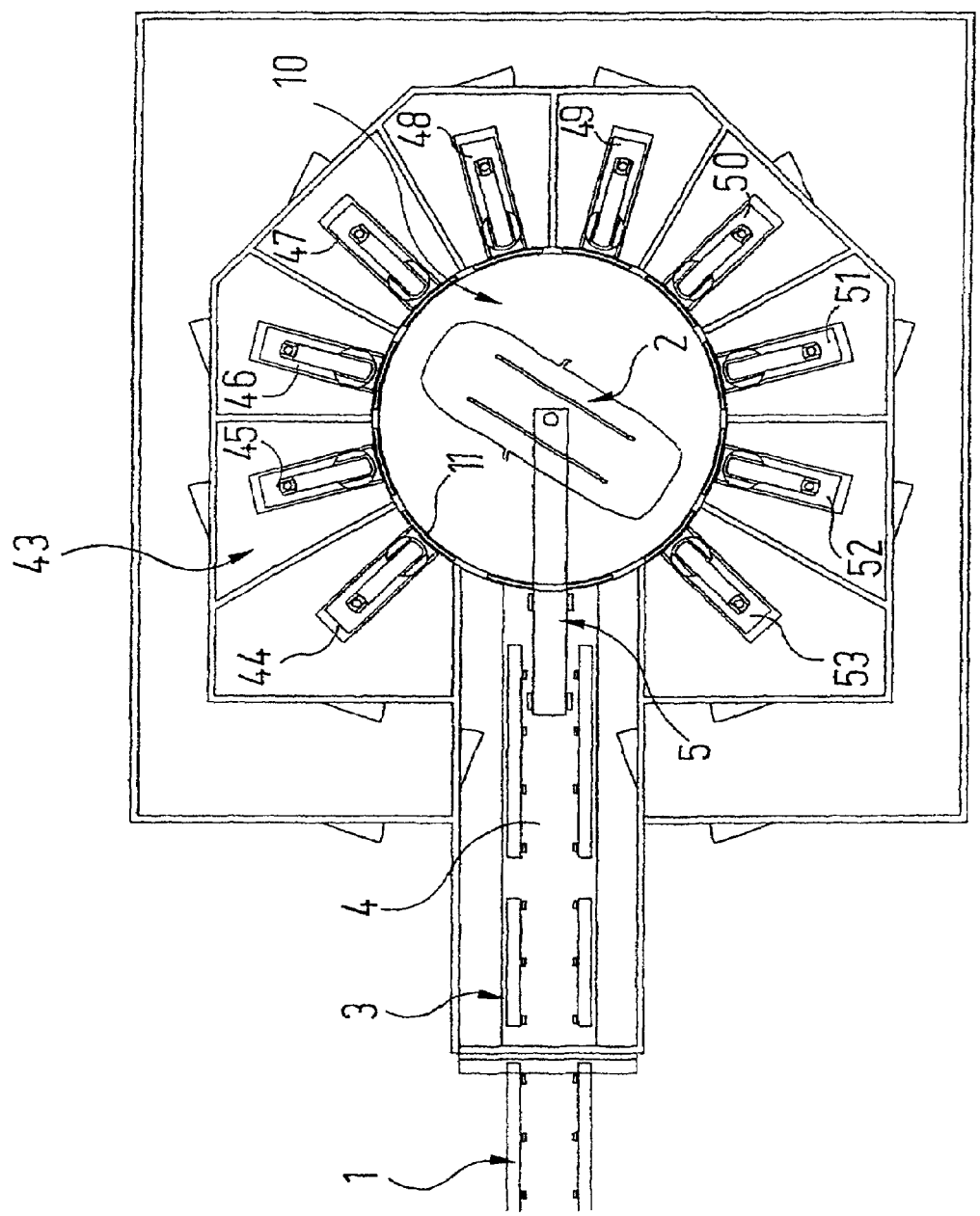
FIG. 2 is a horizontal section through the coating installation of FIG. 1 along line II-II therein.
Figure 3:
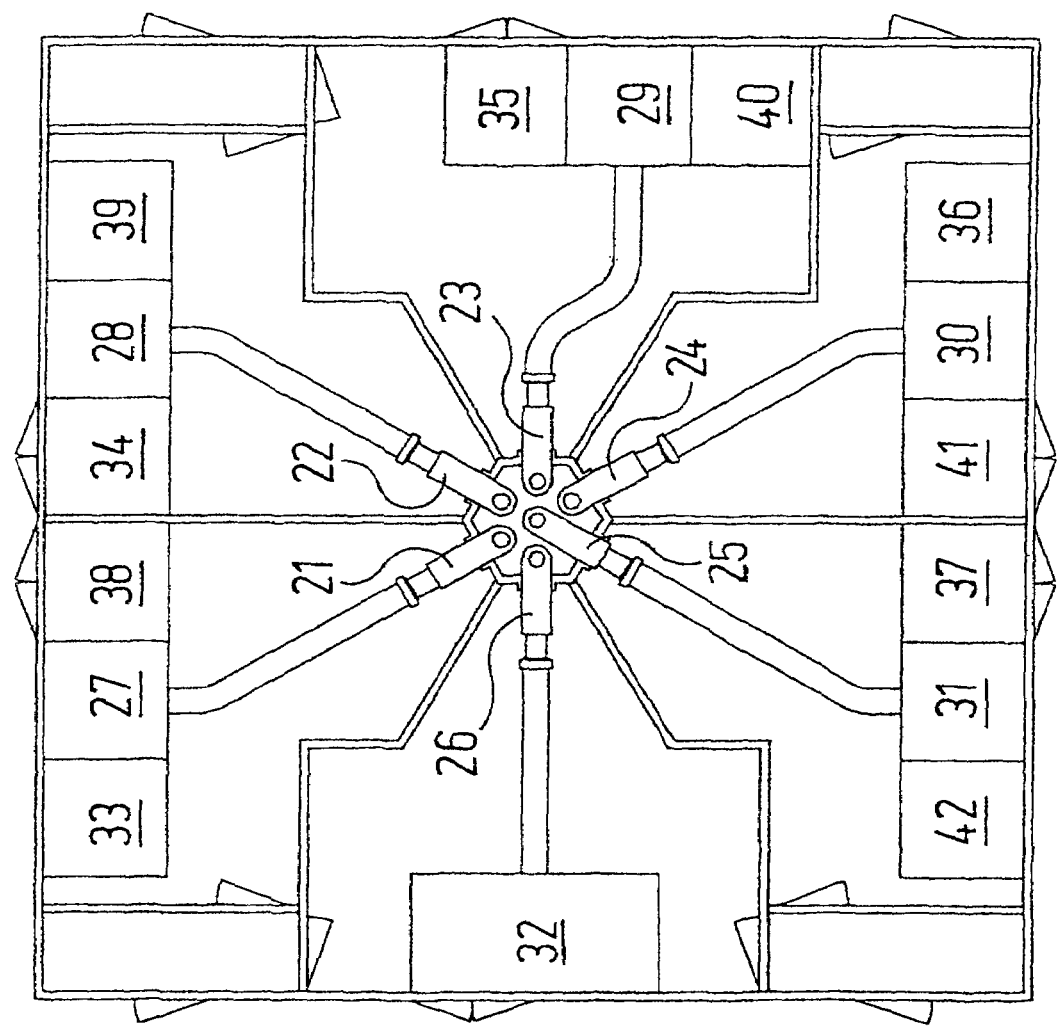
FIG. 3 is a further horizontal section through the coating installation of FIG. 1 along line III-III therein.

The coating installation illustrated in FIGS. 1 to 3 comprises a conveyor 1, which supplies the articles to be coated, these being car bodies 2 in the exemplary embodiment shown. The bodies 2 are firstly introduced into an ante-chamber 3 and are there positioned by means of the conveyor 1 on a lifting stand 4. The lifting stand 4 is in a position to raise the bodies 2 somewhat out of the conveying plane of the conveyor 1, such that a traveling shuttle conveyor 5 may move under the raised body 2. The shuttle conveyor 5 is so called because it moves constantly to and fro between two positions. One of these positions is the one just mentioned, in which it is drawn back completely into the ante-chamber 3 and is located beneath the body 4 raised by the lifting stand 4.

The shuttle conveyor 5 comprises a projecting arm 6, at the end of which there is arranged a rotary stand 7 rotatable about a vertical axis. The rotary stand 7 may be set in rotation by a motor (not shown); it comprises a substantially horizontal receptacle 8 in each case for one body 2.

In the first position, already mentioned above, of the shuttle conveyor 5, the rotary stand 8 is located beneath the raised body 2. If this body 2 is moved downwards by lowering of the lifting stand 4, it is positioned on the receptacle 8 of the shuttle conveyor.

The coating booth 10 proper adjoins the ante-chamber 3 of the coating installation, and may be closed relative to the ante-chamber 3 by a vertically movable door 9. The coating booth 10 comprises a side wall 11, circular in plan view, which has a larger diameter in the upper area 11b than in the lower-area 11a, in which the spray processes essentially proceed. The annular gap 12 thus formed between the two areas 11a, 11b of the side wall 11 is used for extraction of the upper interior area of the coating booth 10; the fan and lines used therefor are not shown, for the sake of clarity. Stray powder coating particles are removed from the upper interior area of the coating booth 10 by the above-described extraction, such that in general further cleaning of the upper side wall area 11b is not absolutely necessary.

An air plenum 13 is provided in the uppermost area of the interior of the coating booth, which air plenum is delimited at the bottom by a filter ceiling 14. Fresh air is fed to the air plenum 13 via a line, not shown in the drawings, and is introduced in the direction of the arrows through the filter ceiling 14 into the interior of the coating booth 10 lying therebelow.

A blowing device, which is provided overall with the reference numeral 15, extends centrally through the uppermost ceiling of the coating booth 10 and through the filter ceiling 14. The blowing device 15 comprises a vertically extending tube 16, which is additionally movable in the vertical direction and which is connected articulatedly at its lower end with a blowing arm 17. The blowing arm 17 may be swivelled, as shown schematically in the drawings, in such a way that in one end position it constitutes virtually a coaxial extension of the tube 16 and in the other end position forms a right angle therewith.

The entire blowing device 15 may be moved not only vertically, as already mentioned, but also about the axis of the tube 16.

The bottom of the coating booth 10 takes the form of a collecting hopper 18, at the bottom of which there is formed a radially outwardly projecting annular flange 19. The suction opening of one of a total of six bent suction discharge pipes 21, 22, 23, 24, 25, 26 may be slipped as desired beneath the lower outlet opening 20 of the collecting hopper 18. The suction openings of the suction discharge pipes in each case not slipped beneath the outlet opening 20 of the collecting hopper 18 (i.e. in FIG. 3 the suction discharge pipes 21, 22, 23, 24 and 26) are covered at the top by the flange 19 and thus sealed.

As FIG. 3 shows, the suction discharge pipes 21, 22, 23, 24, 25, 26 are connected in the "basement" of the coating installation in each case with a separating device 27, 28, 29, 30, 31, 32, e.g. a filter or a cyclone. Each of these separating devices 27 to 32 are associated with an extractor fan and a collecting vessel, which are not shown in FIG. 3 for the sake of clarity. The arrangement may also be such that all separating devices 27 to 32 are connected with a single extractor fan via a pipe system, wherein each separating device 27 to 32 is associated with a clack valve, which is closed in the normal state and is only opened for the separating device 27 to 32 which is currently active.

On each side of the separating devices 27 to 31 there is provided a storage vessel 33, 34, 35, 36, 37 for fresh coating powder and a storage vessel 38, 39, 40, 41, 42 for mixed powder, which is composed of fresh coating powder and recovered coating powder. The separating device 32 has a special task, as explained below; it does not comprise any such additional storage vessels.

As FIG. 2 shows, a total of 10 coating robots 44, 45, 46, 47, 48, 49, 50, 51, 52, 53 are arranged in the "ground floor" of the coating installation in a chamber 43 surrounding the coating booth 10 proper. Each coating robot 44 to 53 comprises a robotic arm 54 swivellable and rotatable in known way about a plurality of axes, as shown in FIG. 1 for the coating robot 48. The robotic arms 54 each carry at their ends an application device 55 for applying the powder coating, for example a high-speed rotary spraying atomiser, and may be introduced through a window in the side wall 11 into the inside of the coating booth 10.

In the case of the above-described coating installation, diametrically opposed pairs of coating robots 44 to 53 are in each case charged with powder coating of the same colour.

The above-described coating installation operates as follows:

A car body 2 to be coated is introduced into the antechamber 3 by means of the conveyor 1 and positioned on the lifting stand 4. As already described, it is then raised somewhat, such that the shuttle conveyor 5 with the receptacle 8 of its rotary stand 7 may travel beneath the body 2. By lowering the lifting stand 4, the body 2 is then positioned on the receptacle 8 of the shuttle conveyor 5. The shuttle conveyor 5 moves together with the body 2 in the direction of the coating booth 10, until the axis of the rotary stand 7 is located approximately in the axis of the coating booth 10. This is the position shown in FIG. 1. All the parts of the shuttle conveyor 5 which might cause soiling are located outside the coating booth 10. Only the extension arm 6 projects into the interior of the coating booth 10.

The door 9 is then closed by lowering. This door 9 has a recess, such that the extension arm 6 may be guided therethrough, while the connection between the interior of the coating booth 10 and the ante-chamber 3 is otherwise broken.

The body 2 located in the coating booth 10 may then be coated in one of five different colour tones. The two coating robots 44 to 53 charged with the appropriate colour move their robotic arms 54 with the application devices 55 through the corresponding windows in the annular wall 11 into the interior of the coating booth 10. The application devices 55 begin to operate. At the same time, the rotary stand 7 is set in continuous or intermittent rotation. In this way, the body 2 may be completely coated from two sides by rotating the rotary stand 7 by approximately 180.degree.

When the coating process is complete, the coating robots 44 to 53 in use retract their robotic arms 54 back into the position shown in FIGS. 1 and 2. The door 9 is opened by lifting. The shuttle conveyor 5 travels back into the antechamber 3. By raising the lifting stand 4, the body 2 is removed from the shuttle conveyor 5, which then travels somewhat back in the direction of the coating booth 10. The coated body 2 is brought to the height of the conveyor 1 and then conveyed away out of the ante-chamber 3.

During the coating process the suction discharge pipe 21 to 26 which corresponds to the colour currently being processed is located beneath the outlet opening 20 of the collecting hopper 18. The coating particles sucked into the collecting hopper 18 are therefore fed to the corresponding filter device 28 to 32 and stored in the collecting vessel at that point. They may either be fed from there directly back to the application devices 55 of the corresponding coating robot 44 to 53 or firstly brought into the collecting vessel 38 to 42 in a mixture with fresh powder from the associated storage vessel 33 to 37 and fed from there back to the coating process.

The stray coating powder particles in the upper area of the coating booth 10, which are present there only in a very low concentration, are continuously extracted via the gap 12, collected and thrown away, such that the upper area lib of the annular wall 11 is virtually unsoiled.

As long as the colour with which the bodies 2 are to be coated does not need to be changed, the above-described process is repeated for each individual body 2. However, if a colour change is desired, the following takes place:

The suction discharge pipe 26 connected to the filter device 32 (c.f. FIG. 3) is slipped under the outlet opening 20 of the collecting hopper 18. The blowing device 15 is then brought into operation, which, with simultaneous lowering, rotation and swivelling of the blowing arm 17, is guided downwards in such a way that the entire inner surface of the annular wall 11 and the conical surface of the collecting hopper 18 are airblasted. The coating powder particles then detached from the surfaces are discharged via the outlet opening 20 of the collecting hopper 18 and fed back to the filter device 32 via the suction discharge pipe 26. The coating particles collecting here are thrown away.

The blowing device 15 is then drawn upwards back into its rest position. The next body 2 may be brought into the coating booth 10 in the manner described. Two different coating robots 44 to 53, charged with powder coating of the new colour, are brought into operation; before that, the corresponding suction discharge pipe 21 to 25 is brought under the outlet opening 20 of the collecting hopper 18.

In an exemplary embodiment not shown in the drawings, the lifting stand 4 is dispensed with. Instead, the rotary stand 7 of the shuttle conveyor 5 is so constructed that it may move vertically. The vertical movements necessary for transfer of the body from the conveyor 1 onto the receptacle 8 of the rotary stand 7 and back are performed in this case by the rotary stand 7.

Figure 4:
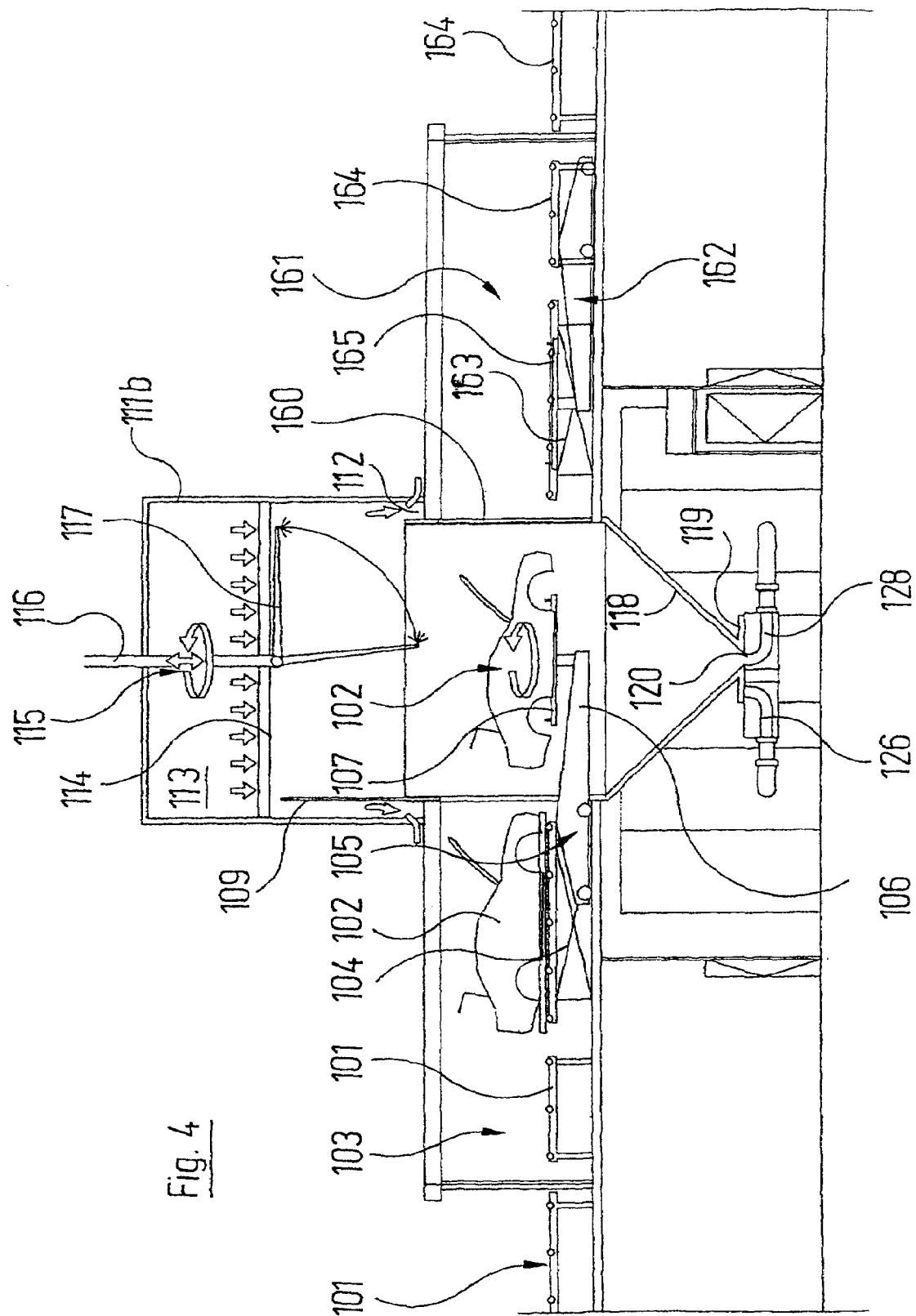
FIG. 4 is a vertical section through a second exemplary embodiment of a coating installation.
Figure 5:
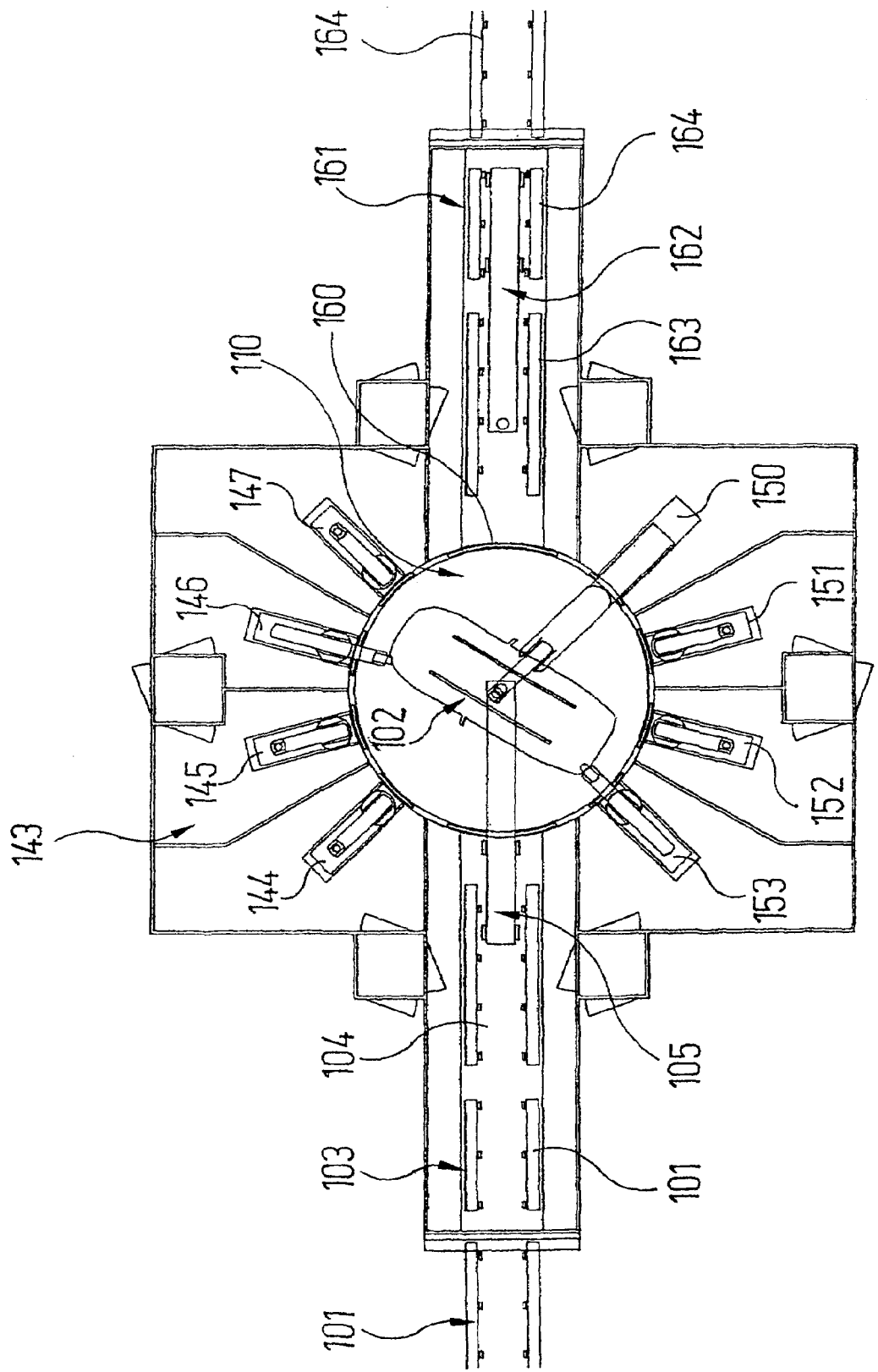
FIG. 5 is a horizontal section through the coating installation of FIG. 4 along line V-V therein.
Figure 6:
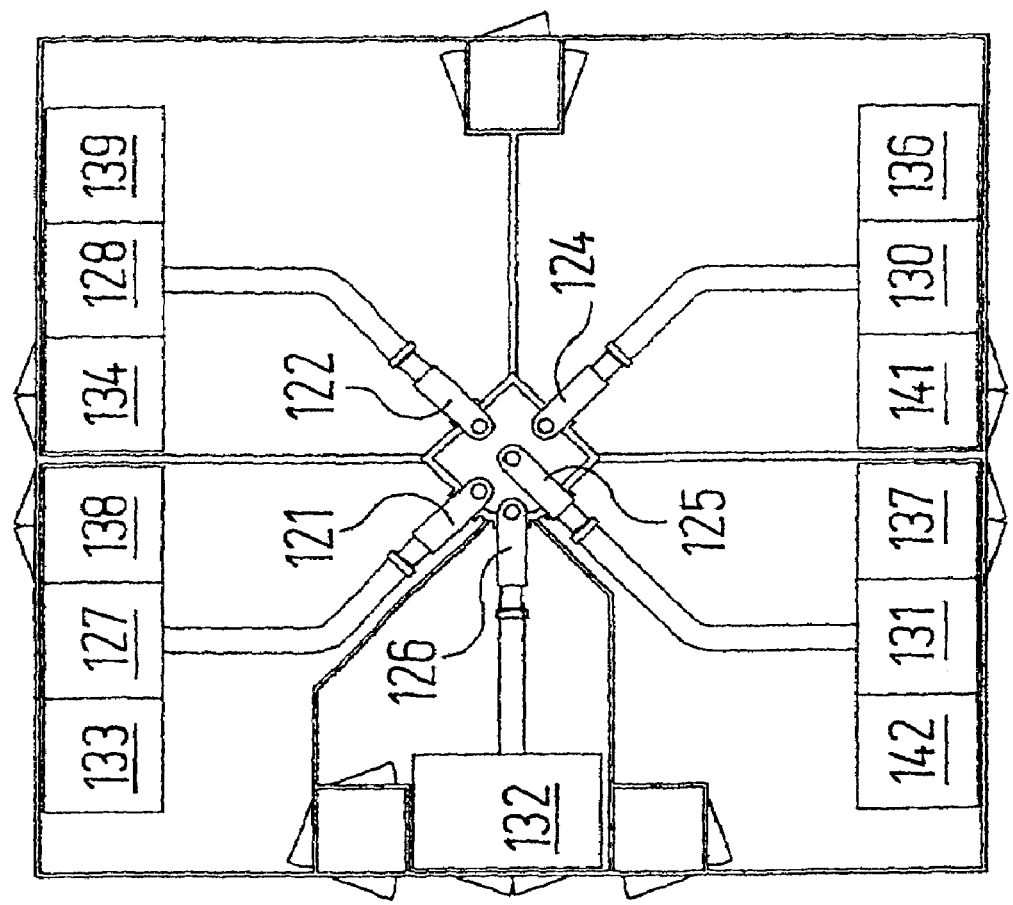
FIG. 6 is a further horizontal section through the coating installation of FIG. 4 along line VI-VI therein.

The exemplary embodiment of the coating installation illustrated in FIGS. 4 to 6 is very similar to the first exemplary embodiment described above with reference to FIGS. 1 to 3. Corresponding parts are therefore labelled with the same reference numerals plus 100.

The main difference between the second exemplary embodiment and the first is that the second is operated on a continuous pass-through basis.

FIG. 4 shows again, substantially unchanged from FIG. 1, the conveyor 101, the ante-chamber 103, the lifting stand 104 and the shuttle conveyor 105, the door 109 and the coating booth 110.

In contrast to the coating booth 10 of FIGS. 1 to 3, the coating booth 110 of FIGS. 4 to 6 comprises a second door 160 lying diametrically opposite the door 109. This door 160 separates the interior of the coating booth 110 from an outlet chamber 161. Inside the outlet chamber 161 there are located a further shuttle conveyor 162, a further lifting stand 163 and a further conveyor 164.

As is particularly clear from FIG. 5, two coating robots have been dispensed with in the second exemplary embodiment of the coating installation due to the outlet chamber 161, namely those robots which in FIG. 2 bear the reference numerals 48, 49. The coating installation according to FIGS. 4 to 6 therefore has only eight coating robots 144 to 147, 150 to 153, which surround the coating booth 110.

The number of separating devices 127, 128, 130, 131, 132, which are located in the basement of the coating installation, and of suction discharge pipes. 121, 122, 124, 125, 126, whose suction openings may be slipped as desired under the outlet opening 120 of the collecting hopper 118, is therefore also reduced accordingly.

The upper area of the coating booth 110 is unchanged with regard to the first exemplary embodiment in the construction of the area 11b of the side wall 111, the air plenum 113 and the blowing device 115 and of the extraction gap 112 between the upper area 111b and the lower area 111a of the side wall 111.

Operation of the second exemplary embodiment of a coating installation corresponds extensively to that of the first exemplary embodiment:

Introduction of the bodies 102 into the coating booth 110 and the actual coating process proceed in precisely the same way as for the first exemplary embodiment. The only difference is that the choice of different colour tones is reduced to four, which are each associated with two coating robots 144 to 147 and 150 to 153 and a suction discharge pipe 121, 122, 124, 125.

However, after completion of the coating process, the bodies 102 are not removed backwards from the coating booth 110 through the ante-chamber 103 but rather are brought by means of the second shuttle conveyor 162 in the "forwards direction" into the outlet chamber 161. To this end, the second door 160 is opened and the second shuttle conveyor 162 travels with its receptacle 165 under the receptacle 108 of the first shuttle conveyor 105. The receptacle 165 of the second shuttle conveyor 162 does not need to be rotatable. However, it may be moved in the vertical direction. The geometry of the two receptacles 108, 165 is mutually conformed in such a way that the receptacle 165 of the second shuttle conveyor 162 may move past the receptacle 108 of the first shuttle conveyor 105 in a vertical movement, such that the body 2 is transferred from the receptacle 108 onto the second receptacle 165. When this has happened, the first shuttle conveyor 105 moves back into the ante-chamber 103, where the next body 102 awaits coating.

The second shuttle conveyor 162 travels into the outlet chamber 161 in such a way that the body 102 is located above the conveyor 164. By lowering the receptacle 165, the body 102 is transferred onto the conveyor 164 and moved away.

In the exemplary embodiment of FIGS. 4 to 6, the cleaning process necessary in the event of a colour change is performed in the same way as in the exemplary embodiment explained with reference to FIGS. 1 to 3.

In the two above-described embodiments of the coating installation, the rotary stand 7 or 107, on which the bodies 2 or 102 to be coated are rotated during the coating process, is located at the end of the extension arm 6 or 106 of the first shuttle conveyor 5 or 105. In an alternative embodiment not shown in the drawings, the rotary stand is attached stationarily in the centre of the coating booth and the first shuttle conveyor serves solely to transfer the body from the conveyor onto the rotary stand and optionally vice versa. Otherwise, in this exemplary embodiment too the coating and cleaning processes proceed in the same way as described above.

What is claimed is:

1. An installation for powder coating of articles, the installation comprising:
    a) a coating booth, in which the articles may be arranged during the coating process, wherein the coating booth has walls and a bottom;
    b) a plurality of application devices for the powder coating, which may be arranged in the coating booth and which may act on the articles located therein;
    c) a sole collecting hopper arranged at the bottom of the coating booth and comprising an outlet opening;

d) a recovery device for powder overspray, which in turn comprises:
  da) a collecting vessel for recovered powder coating;
  db) a separating device; and,
  dc) an extractor fan, which sucks the powder coating collecting in the sole collecting hopper through the outlet opening of the sole collecting hopper into the separating device;
e) a rotary stand arranged in the coating booth, to which the articles may be attached and which may be rotated about a fixed position and about a substantially vertical axis;
f) at least two application devices arranged in at least two different angular positions relative to the vertical axis of the rotary stand, wherein each of the application devices are chargable with a powder coating of a particular colour, and further wherein each angular position corresponds to a different powder coating colour; and,
g) a plurality of recovery devices for powder of different colours is provided, which may be brought as desired into connection with the outlet opening of the sole collecting hopper when the application device of the corresponding colour is in use.

2. An installation according to claim 1, characterised in that a cleaning device is provided, with which powder coating may be detached from the walls of the coating booth, and in that a collecting device for waste powder is provided which may be brought into connection with the outlet opening of the sole collecting hopper while the cleaning device is active.

3. An installation according to claim 2, characterised in that the cleaning device is a blowing device.

4. An installation according to claim 3, characterised in that the blowing device comprises a tube displaceable in an axial direction of the blowing device and rotatable about its axis.

5. An installation according to claim 4, characterised in that a blowing arm swivellable about an axis perpendicular to the axis of the tube is attached to an end of the tube.

6. An installation according to claim 1, characterised in that a flange surrounding the outlet opening is provided at a lower end of the sole collecting hopper, and in that each recovery device and optionally the collecting device for waste powder comprises a suction discharge pipe, which may be moved to and fro between a first position, in which its suction opening is closed by the flange, and a second position, in which its suction opening communicates with the outlet opening of the sole collecting hopper.

7. An installation according to claim 1, in which a conveying system is provided with which the articles may be brought into the coating booth and out of the coating booth, characterised in that the conveying system comprises a shuttle conveyor, which is in a position to receive from another part of the conveying system at least one article in a first position outside the coating booth and to bring this article into a second position inside the coating booth.

8. An installation according to claim 7, characterised in that the shuttle conveyor comprises a projecting extension arm, which projects into the coating booth in the second position.

9. An installation according to claim 8, characterised in that the rotary stand is arranged at the end area of an extension arm.

10. An installation according to claim 7, characterised in that the shuttle conveyor is in a position to bring the article, of which there is at least one, back from its second position inside the coating booth into its first position on the other part of the conveying system.

11. An installation according to claim 7, characterised in that a second shuttle conveyor is provided, which is in a position to receive the article, of which there is at least one, in the second position thereof inside the coating booth and to transfer it to a further part of the conveying system in a third position outside the coating booth.

12. An installation for powder coating an article, the installation comprising:
  a coating booth including walls and a bottom;
  a collecting hopper disposed about the bottom of the coating booth and comprising an outlet opening;
  a collecting device for waste powder, the collecting device being capable of being connected to the outlet opening of the collecting hopper;
  a plurality of recovery devices for powder overspray, each of the plurality of recovery devices including a collecting vessel for recovered powder coating, a separating device, and an extractor fan, wherein the extractor fan moves the powder coating collecting in the collecting hopper through the outlet opening of the collecting hopper and into the separating device;
  a rotary stand disposed within the coating booth, to which the article may be attached and which may be rotated about a fixed position and a substantially vertical axis within the coating booth;
  at least two application devices for the powder coating being disposed in at least two different angular positions relative to the axis of the rotary stand, each of the at least two application devices are chargable with a powder coating of a particular colour and each angular position corresponds to a different powder coating colour; and,
  a flange operably connecting the outlet opening of the collecting hopper with the plurality of recovery devices wherein the flange facilitates an exclusive connection between one of the plurality of recovery devices and the outlet opening of the collecting hopper.

13. The installation of claim 12 further comprising: a cleaning device for detaching coated powder from the walls of the coating booth; the collecting device for the waste powder being connected to the outlet opening of the collecting hopper during operation of the cleaning device.

14. The installation of claim 13 wherein the cleaning device is a blowing device.

15. The installation of claim 14 wherein the blowing device comprises a tube displaceable in an axial direction of the blowing device and rotatable about its axis.

16. The installation of claim 15 further comprising: a blowing arm swivellable about an axis perpendicular to the axis of the tube and attached to an end of the tube.

17. The installation of claim 12 further comprising:
  a suction discharge pipe connected to each recovery device,
  wherein the flange facilitates an exclusive connection between one of the plurality of recovery devices and the outlet opening of the collecting hopper, the flange and the suction discharge pipe of each of the plurality of recovery devices being capable of movement there between such that only one of the plurality of recovery devices being communicably attached to the collecting hopper.

18. The installation of claim 12 further comprising:
  a conveying system including a shuttle conveyor having a first position outside the coating booth and a second position inside the coating booth wherein articles are moved from the first position to the second position.

19. The installation of claim 18, wherein the shuttle conveyor includes a projecting extension arm that projects into the coating booth in the second position.

20. The installation of claim 19, wherein the rotary stand is arranged at the end area of the extension arm.

21. The installation of claim 18 wherein articles are moved from the second position to outside the coating booth.

22. The installation of claim 18 further comprising:
a second shuttle conveyor receives the article from the first shuttle conveyor.

23. The installation of claim 12 wherein the outlet opening of the collecting hopper includes a plurality of openings and each of the plurality of openings exclusively corresponding to one of the plurality of collection devices.

* * * * *